United States Patent [19]

Allen, III

[11] Patent Number: 4,977,682
[45] Date of Patent: Dec. 18, 1990

[54] HAND HELD OVALITY GAUGE
[75] Inventor: Charles H. Allen, III, Pittsburgh, Pa.
[73] Assignee: Allen Gauge & Tool Company, Pittsburgh, Pa.
[21] Appl. No.: 309,095
[22] Filed: Feb. 10, 1989
[51] Int. Cl.⁵ .............................................. G01B 5/20
[52] U.S. Cl. ...................................... 33/550; 33/543; 33/501.1; 33/544.6
[58] Field of Search ................ 33/543, 550, 557, 556, 33/605, 812, 811, 795, 501.1, 501.2, 544.6, 555.1, 555.3

[56] References Cited
U.S. PATENT DOCUMENTS

| | | | |
|---|---|---|---|
| 1,308,324 | 7/1919 | Bellard | 33/178 R |
| 1,394,974 | 10/1921 | Danielsson | 33/501.09 |
| 1,625,462 | 4/1927 | Frauenthal | 33/178 R |
| 1,637,482 | 8/1927 | Graves | 33/178 R |
| 2,197,198 | 4/1940 | Street | 33/178 R |
| 2,515,214 | 7/1950 | Goldberg | 33/501.1 |
| 2,579,569 | 12/1951 | Hauck et al. | 33/792 |
| 2,620,569 | 12/1952 | Scrivener | 33/199 |
| 2,646,627 | 7/1953 | Tillyer et al. | 33/794 |
| 2,657,468 | 11/1953 | Lyons | 33/556 |
| 2,770,050 | 11/1956 | Johnson | 33/199 |
| 2,785,474 | 3/1957 | Mages | 33/178 |
| 2,863,223 | 12/1958 | Reicherter | 33/178 |
| 3,144,206 | 12/1963 | Eckert | 33/795 |
| 3,191,311 | 6/1965 | Brown et al. | 33/169 |
| 3,222,788 | 12/1965 | Neslund | 33/178 R |
| 3,277,578 | 10/1966 | Johnson | 33/199 |
| 3,305,932 | 2/1967 | Iselin | 33/178 D |
| 3,468,034 | 9/1969 | Blinder | 33/174 |
| 3,638,324 | 2/1972 | Kaifesh | 33/543 |

FOREIGN PATENT DOCUMENTS

| | | | |
|---|---|---|---|
| 1944605 | 5/1971 | Fed. Rep. of Germany | 33/550 |
| 3333424 | 4/1985 | Fed. Rep. of Germany | 33/543 |

OTHER PUBLICATIONS

Allen Gauge & Tool Company Brochure, Catalog 85.

Primary Examiner—Thomas B. Will
Attorney, Agent, or Firm—Webb, Burden, Ziesenheim & Webb

[57] ABSTRACT

An ovality gauge includes an elongated frame member carrying a roller support arm having a pair of rollers rotatably mounted to the roller support arm and spaced apart from each other. Preferably the rollers are adjustable to various positions. The ovality gauge also includes a moveable contact spaced from the pair of rollers, with the moveable contact and rollers in a plane parallel to the elongated frame member. The moveable contact is connected to an indicator means whereby movement of the moveable contact with respect to the pair of rollers is detected and indicates deviations of a cylindrical member contacting the gauge from perfect roundness.

44 Claims, 2 Drawing Sheets

HAND HELD OVALITY GAUGE

BACKGROUND OF THE INVENTION

1. Field of the Invention

This invention relates to gauges and, more particularly, to gauges for measuring distortions or irregularities of the shape of cylindrical or truncated cone-shaped objects from desired circular dimensions.

2. Description of the Prior Art

Measuring ovality or the roundness of cylindrical or truncated cone-shaped objects, or distortions or deviations therefrom, is particularly critical in a variety of applications. For example, in the petroleum industry it is extremely important that the threaded connectors between adjacent pipes and other tubular or cylindrical members are formed within established tolerances to provide a secure and tight fit therebetween. Since pipes are often joined together in lengths of many thousand feet and are inserted into deep bore holes in the ground, it is a mandated practice to critically inspect each threaded connector before using a particular pipe. Inspectors scrutinize the threaded connectors for small deviations from accepted norms.

Such standards are set by the American Petroleum Institute and others for equipment used in the petroleum industry. One of the criteria used to judge the perfection or imperfection of threaded connectors is the degree by which the connector deviates from a perfect circle at various locations on the connector. This is important for both straight connectors as well as tapered connectors and is particularly important at the ends where the pipes are threaded together.

Ovality or deviations from perfect roundness of a pipe can occur in a number of different ways. The pipe can be dropped or crushed during shipment or unloading, with resultant damage to its threaded end. The pipe could have been formed out of round before the threads were cut. Finally, damage may occur while the threads were being formed. This is particularly important since a commonly used threading machine grips the pipe at only three places and can cause what is referred to as triangulation errors in the pipe.

A variety of devices are currently used for measuring ovality of the inside or outside surface of a threaded connector. Taper gauges having a two-point contact which spans the diameter of the threaded connector are positioned at a particular location. By moving the gauge plus or minus 90° progressively around the threads, deviations from perfect roundness can be determined by comparing the changes actually measured by the taper gauge with the standards for a perfectly formed pipe. Representative taper gauges are sold by Allen Gauge & Tool Company, the assignee of the present application, under Model Nos. 5606, 5554 and 5572. However, taper gauges cannot readily detect triangulation errors since only two points contact the pipe.

In addition, saddle and C-shaped gauges, such as those sold by Allen Gauge & Tool Company under Model Nos. 5336 and 9800 have been used to measure ovality. See also the gauge shown in U.S. Pat. No. 2,863,223. However, these devices are generally used to measure ovality away from the ends of a pipe. Other devices for measuring ovality are shown in U.S. Pat. Nos. 1,637,482, 2,620,569, 2,770,050, 2,785,474, 3,191,311 3,277,578, and 3,468,034. However, all of these devices have one or more problems which make them unsuitable for field measurements of threaded or unthreaded connectors on petroleum pipe and the like. For example, some of the devices are complicated bench devices or are made specifically for measuring one particular type and size of cylindrical object. In addition, some of these devices are not readily adjustable for varying diameters of pipe and are not particularly suited for field measurements at the end of a pipe with great precision. Moreover, some of these devices are not suitable for measuring the tapered threaded connectors commonly used in the petroleum industry.

Accordingly, it is an object of the present invention to provide an ovality gauge which is portable, hand held, and easily used by an inspector in the field. In addition, it is an object to provide such a device which can be used on tapered, non-tapered, threaded or smooth surfaces. It is an object to provide an ovality gauge which is adjustable for a wide variety of diameters and can provide means for precisely positioning the gauge on the end of an object to measure ovality at a prescribed location. It is also an object to provide a device which can be used to measure the ends of both internal and external surfaces of cylindrical or conical objects.

SUMMARY OF THE INVENTION

Accordingly, I have invented an ovality gauge which includes in one embodiment a frame including an elongated frame member and a stationary arm extending therefrom perpendicular to and connected to the elongated frame member. The gauge also includes an elongated adjustable arm connected to and moveable along the elongated frame and including means for locking the adjustable arm to the elongated frame member in a desired location. The adjustable arm extends perpendicular outward from the frame member from the same side as, parallel to and spaced from the stationary arm. In addition, the gauge includes a roller support arm connected to an end of one of the stationary arm or the adjustable arm, preferably the adjustable arm, opposite the elongated frame member and extending perpendicular thereto and to a plane parallel to the adjustable arm, stationary arm and frame member.

The gauge also includes a pair of rollers rotatably mounted to the roller support arm and spaced apart from each other and an indicator means mounted to the other of the stationary arm or adjustable arm and having a moveable contact connected thereto. Movement of the moveable contact is detected by the indicator means. The moveable contact and the pair of rollers are aligned with one another in a plane extending perpendicular to the stationary arm and the adjustable arm and parallel to the elongated frame. The gauge can also include on the roller support arm means for varying the spacing between the pair of rollers, such as a pair of elongated slots, and releasable locking means, such as a lock screw, mounting the rollers to the adjacent slot. The roller support arm can also include a roller bracket extending perpendicular thereto adjacent each slot, with releasable locking means mounting the brackets to the roller support arm and with a roller mounted at the end of each roller bracket opposite the associated slot. Preferably the rollers are mounted on a face of the roller brackets directed toward the elongated frame member.

The indicator means is preferably a dial indicator having a stem and a moveable spindle within the stem, with the moveable contact connected to the moveable spindle and with the moveable spindle perpendicular to the associated arm. The moveable contact is preferably a flat contact pivotally mounted to an end of the moveable spindle exterior of the stem. A spring can surround the stem and spindle and extend between the dial indicator and the moveable contact.

The gauge can also include stops moveably mounted on either or both of the adjustable arm and stationary arm and including means for releasably locking the stop thereto. Each stop can include a base mounted around an associated arm and one or more fingers, preferably a pair of fingers, carried by a flange on t he base. The fingers on one stop can be oriented toward but offset from fingers on the opposite stop.

The dial indicator can further include a plunger housing surrounding the moveable spindle and having one end attached to the stem. A plunger assembly is positioned within the other end of the plunger housing and has a first shank extending therein and contacting the moveable spindle and has a second shank extending out of the plunger housing. The plunger can be retained within the plunger housing by an inward flange on the end of the plunger housing opposite the stem and a lip on the plunger between the shanks which engages the flange. A bias means, such as a coil spring surrounding the spindle and the first shank and extending between the stem and the lip can be used to bias the plunger out of the plunger housing. The moveable contact can be pivotally connected to the end of the second shank.

In accordance with another embodiment of this invention, an ovality gauge includes an elongated frame member and an adjustable roller support arm connected to and moveable along a front face of the frame member. The roller support arm includes means for locking it to the frame member in a particular location and the roller support arm extends beyond the frame member perpendicular to an axis extending along the length of the frame member. The gauge also includes a pair of rollers rotatably mounted to the roller support arm on a face opposite the front face of the frame member and spaced apart from each other. The gauge also includes a moveable contact mounted to the frame adjacent the front face and in alignment with the pair of rollers and spaced therefrom. The moveable contact and the rollers are located in a plane parallel to the front face of the frame member.

An indicator means is mounted to a rear face of the frame member and means are provided to connect the moveable contact to the indicator means to provide a direct indication of movement of the moveable contact from a particular position with respect to the pair of rollers. The roller support arm in this embodiment is similar to that in the first embodiment and can include the means for adjusting the position of the rollers thereon.

The gauge can also include a handle extending outwardly from the rear surface of the frame member and a first wear plate adjacent the front face of the frame member and adjacent, preferably integral with, the roller support arm. The frame member can have a mounting bracket on the front face thereof at one end and a slot extending through the frame member and the bracket. In this manner, the moveable contact includes a rocker arm pivotally mounted within the slot and extending beyond the mounting bracket and rear face of the frame member. A third roller is pivotally attached to the end of the rocker arm adjacent the mounting bracket and the other end of the rocker arm contacts the indicator means.

In this embodiment, the pair of rollers and the third roller are all positioned in a plane parallel to the front face of the frame member. The gauge can also include means for biasing the rocker arm to force the third roller toward the pair of rollers. The indicator means can be a dial indicator with the spindle parallel to the length of the frame member and perpendicular to the axis of the roller support arm. The end of the spindle adjacent the stem extends to and contacts the other end of the rocker arm. Finally, a second wear plate can be mounted to the front face of the frame member adjacent the mounting bracket and the third roller.

DESCRIPTION OF THE PREFERRED EMBODIMENTS

Figure 1:
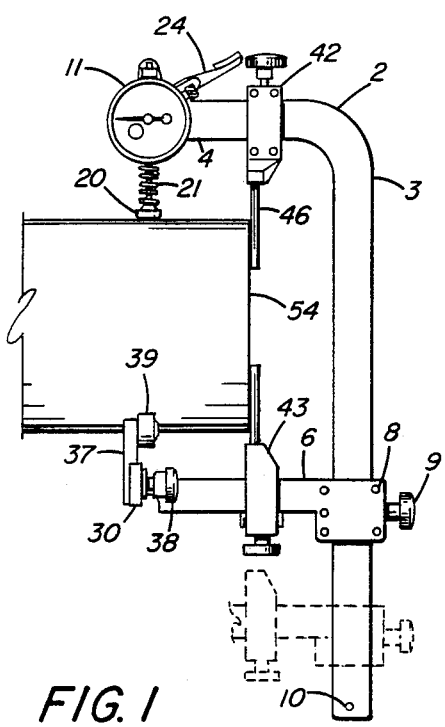
FIG. 1 is a side elevational view of a first embodiment of an ovality gauge in accordance with the present invention positioned on the end of a pipe.
Figure 2:
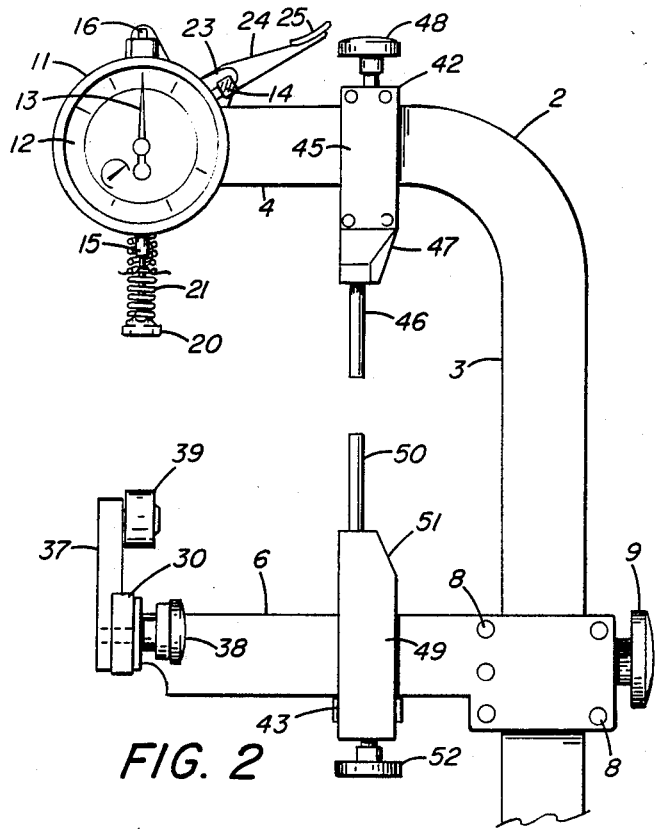
FIG. 2 is an enlarged side elevational view of the ovality gauge shown in FIG. 1.

A first embodiment of an ovality gauge in accordance with the present invention is shown in detail in FIGS. 1-4. This ovality gauge includes an L-shaped frame 2 formed from an elongated vertical body or frame member 3 and a stationary arm 4 extending perpendicularly outward therefrom at about one end. The L-shaped frame 2 as shown is a solid piece having a uniform rectangular cross section and opposed faces substantially wider in dimension than its thickness. The stationary arm 4 is preferably formed integral with the vertical frame 3. An elongated adjustable arm 6 is carried by the vertical frame 3 and extends perpendicularly outward therefrom along the same side as and substantially parallel to the stationary arm 4, but spaced therefrom. The adjustable arm 6 is a thin, rectangular plate which is positioned with one face adjacent a face of the vertical frame 3 and is held thereon by a U-shaped cap 7 which is positioned adjacent the opposite face and the side portions of the vertical frame 3. The cap 7 is securely fastened to the adjustable arm 6 by a plurality of screws 8 or the like. The cap 7 and end of the adjustable arm 6 adjacent the vertical frame 3 should be closely spaced thereto, but permit movement of the adjustable arm 6 along the vertical frame 3 when lock screw 9 has been loosened. Lock screw 9 extends through the cap 7 and contacts the vertical frame 3 to secure the adjustable arm 6 in place. Set screw 10 near the end of the vertical frame 3 opposite the stationary arm 4 prevents the adjustable arm 6 from sliding completely off the vertical frame 3, unless set screw 10 is removed.

A standard dial indicator 11 is mounted near the end of the stationary arm 4 opposite the vertical frame 3, preferably along one of its flat faces, by screws 17 or the like. The dial indicator 11 carries a bezel ring 12 with numbers on its visible face and has a rotating needle 13 therein. A bezel clamp 14 permits rotational adjustment of the bezel ring 12, and clamping at a desired location, to zero the dial indicator 11 as is known in the art. Extending downwardly from the dial indicator 11 and connected thereto is a hollow cylindrical stem 15. A moveable spindle 16, which is basically an elongated cylindrical rod, extends through the dial indicator 11 along its diameter and exits both at the top thereof and through the stem 15 at the opposite side thereof. The moveable spindle 16 is connected to an internal rack mechanism in the dial indicator 11 and diametric movement of the spindle 16 through the dial indicator 11 correspondingly rotates the needle 13. The moveable spindle 16 is normally biased out of the dial indicator 11 through the stem 15. The dial indicator 11 is positioned with the spindle 16 in a plane parallel to both arms 4, 6 and also along a line perpendicular to the stationary arm 4. A ball pivot 19 is threadedly connected to the exposed end of the moveable spindle 16 near the stem 15 and a flat contact 20 is pivotally mounted to the ball pivot 19. A coil spring 21 surrounds the stem 15 and the moveable spindle 16 and extends from the dial indicator 11 to the upper surface of the flat contact 20. Coil spring 21 provides additional biasing of the spindle 16 out of the dial indicator. The pivotal contact of the flat contact 20 to the spindle 16 allows the gauge to be used on both flat and tapered surfaces, with the flat contact 20 remaining in contact therewith at all times.

An opposite face of the stationary arm 4 carries an upwardly extending bracket 23 secured thereto near the dial indicator 11. A thumb lever 24 is pivotally mounted at a mid-point to the upper end of the bracket 23. One end of the thumb lever 24 carries a thumb rest pad 25 and the other end is pivotally mounted to one end of an upwardly extending lift arm 26. The other end of the lift arm 26 is pivotally fastened to one end of a connecting rod 27 which has its other end securely fastened to the end of the spindle 16 opposite the flat contact 20. By depressing the thumb lever 24, the spindle 16 is drawn upward through the dial indicator 11, thus moving the flat contact 20 toward the dial indicator 11.

The adjustable arm 6 has a roller support arm 30 mounted at its approximate mid-point to an end of the adjustable arm 6 opposite the vertical frame 3. The roller support arm 30 extends perpendicular to and beyond the faces of the adjustable arm 6 and perpendicular to a plane parallel to the adjustable arm 6, vertical frame 3 and stationary arm 4. The roller support arm 30 is essentially a flat rectangular plate having elongated slots 31, 32 therein on each side of the point of contact with the adjustable arm 6. A first roller bracket 33, essentially a rectangular plate, is positioned adjacent the face of the roller support arm 30 opposite the adjustable arm 6 above slot 31 and extends upwardly perpendicular thereto toward the stationary arm 4 and parallel to the vertical frame 3. Lock screw 34 passes from the other face of the roller support arm 30 through slot 31 and engages the first roller bracket 33 to hold it in place. The end of the first roller bracket 33 opposite slot 31 carries a first roller 35 pivotally mounted thereto, preferably on the face of the first roller bracket 33 oriented toward the vertical frame 3. The top of the first roller 35 extends beyond the end of the first roller bracket 33 to which it is mounted. By loosening lock screw 34, the first roller bracket 33 can be moved to any position desired along slot 31, and, consequently, the first roller 35 can be positioned at a desired spacing from the adjustable arm 6. Similarly, a second roller bracket 37 is positioned adjacent slot 32 in the roller support arm 30, is held in place by lock screw 38, and carries a second roller 39 at an end thereof opposite slot 32. The rollers 35, 39 have a substantial width, similar to the diameter of the lower surface of the flat contact, to provide an adequate working surface.

As shown in FIGS. 1–4, the roller brackets 33 and 37 extend upwardly toward and are substantially in line with the flat contact 20 carried by the spindle 16 of the dial indicator 11. In other words, spindle 16, flat contact 20, first roller 35 and second roller 39 are located in a plane perpendicular to the stationary arm 4 and adjustable arm 6 and parallel to vertical frame 3. With this arrangement, external round surfaces can be measured as will be described hereinafter in more detail. If the dial indicator 11 were rotated 180° on the stationary arm 4, with the moveable spindle 16 and flat contact 20 pointed upwardly perpendicular thereto, and if the roller support arm 30 were rotated 180°, with the roller brackets 33 and 37 and rollers 35 and 39 oriented downwardly from and perpendicular to the adjustable arm 4, then internal round surfaces could be measured with this gauge. Moreover, in either arrangement the dial indicator 11 and associated mechanisms could be mounted on the end of the adjustable arm 6 and the roller support arm 30 and associated mechanisms could be mounted on the end of the stationary arm 4 and still come within the scope of the present invention.

The ovality gauge shown in FIGS. 1–4 can also include one or more stop members for precisely positioning the gauge on the end of a pipe 54. The stationary arm 4 carries an adjustable upper stop 42 and the adjustable arm 6 carries an adjustable lower stop 43. Each stop is similar in configuration. The upper stop 42 has a base 45 slideably mounted around the stationary arm 4 and a pair of downwardly extending, spaced apart fingers 46 carried by a wider flange 47 on the base 45. Lock screw 48 extends through the base 45 and provides for tight positioning of the upper stop 42 on the stationary arm 4 at a desired location. Similarly, the lower stop 43 has a base 49 slideably mounted around the adjustable arm 6 and a pair of upwardly extending, spaced apart fingers 50 carried by a wider flange 51 on the base 49. Lock screw 52 extends through the base 49 of the lower stop 43 and provides for tight positioning of the lower stop 43 on the adjustable arm 6 at a desired location. The fingers 46 on the upper stop 42 are offset from the fingers 50 on the lower stop 43 to provide an overlapping arrangement when the adjustable arm 6 is positioned close to the stationary arm 4. This arrangement is shown clearly in FIG. 4. While the fingers 46, 50 of the stops 42, 43 are oriented toward each other, which is needed for external measurements, if the gauge shown in FIGS. 1–4 were modified for internal measurements as described above, then the stops 42, 43 would each be rotated 180° from the positions shown and the fingers 46, 50 would be oriented away from each other.

It can be appreciated that with the various adjustable members provided on the ovality gauge shown in FIGS. 1–4, cylindrical pipes and threaded connectors of varying sizes can be tested. Also, the location of the test relative to the end of the pipe can be adjusted with the stops 42, 43 and precisely controlled without the use of additional test equipment. The adjustable arm 6 can move upward and downward by loosening lock screw 9, moving the adjustable arm 6 to a desired location and tightening lock screw 9. Similarly, the rollers 35, 39 can be moved inwardly and outwardly from the center of the roller support arm 30 by loosening lock screws 34 and 38, moving the roller brackets 33, 37 to a desired location, and tightening lock screws 34 and 38. In addition, the upper stop 42 and lower stop 43 can be moved inwardly and outwardly along the stationary arm 4 and adjustable arm 6, respectively, by loosening lock screws 48 and 52, moving the stops therealong to a desired location, and tightening the lock screws 48 and 52 to hold them in place.

Figure 3:
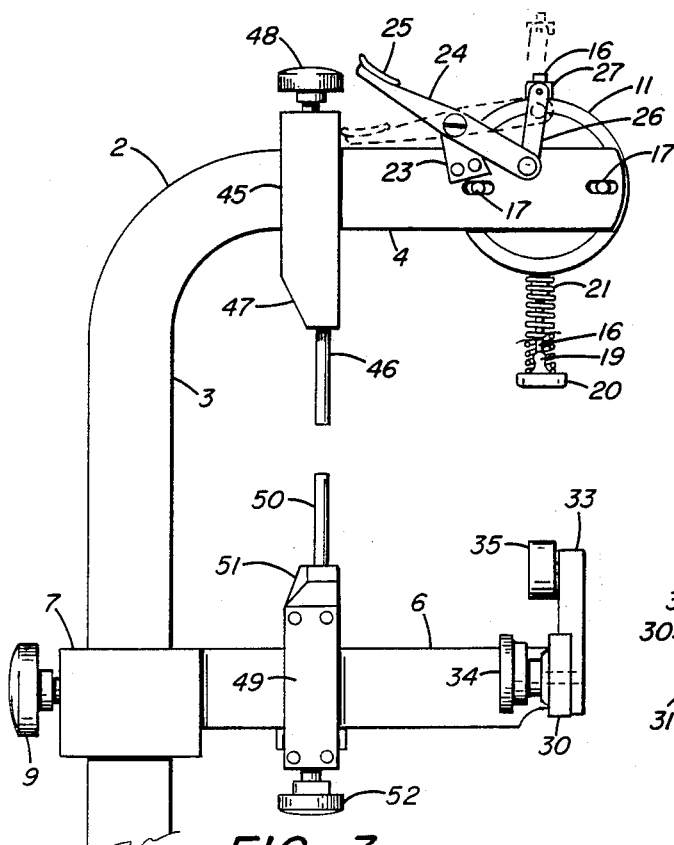
FIG. 3 is an elevational view of the opposite side of the ovality gauge shown in FIG. 1.
Figure 4:
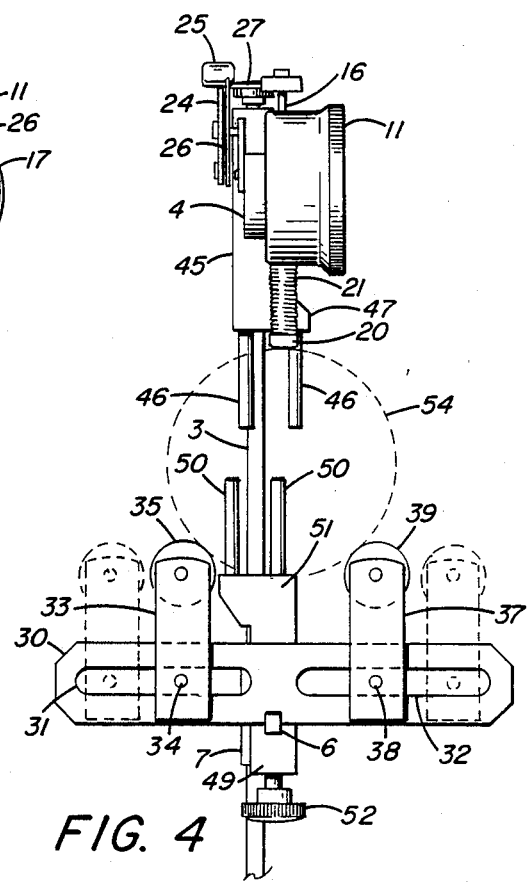
FIG. 4 is a front elevational view of the ovality gauge shown in FIG. 1.

The ovality gauge shown in FIGS. 1–4 functions and is used as follows. Initially, the adjustments are made as described above for the particular diameter pipe in question. The bezel ring 12 on the dial indicator is adjusted to zero in accordance with the specification diameter of the pipe 54. The thumb lever 24 is depressed, raising the flat contact 20 toward the dial indicator 11. The gauge is positioned on the end of a cylindrical object, shown here as an unthreaded pipe 54, with the pipe 54 contacting rollers 33 and 37 as shown in FIGS. 1 and 3. The upper stop 42 and lower stop 43 can be used to precisely position the gauge with respect to the end of the pipe 54 as shown in FIG. 1. Alternatively, the vertical frame 3 can be used as a stop or a marking can be made on the pipe 54 to properly position the gauge. Then the thumb lever 24 is released and the flat contact 20 is dropped down in position on the pipe 54. It is necessary to position the adjustable arm 6 on the vertical frame 3 such that the flat contact 20 can move both upwardly and downwardly to detect all deviations in the roundness of the pipe 54, rather than start the measurement with the spindle 16 fully extended.

The pipe 54 is then either rotated by hand or, preferably, the gauge itself is rotated about the pipe 54. If the pipe 54 is perfectly round, then the spacing between the flat contact 20 and the rollers 35, 39 will remain constant, the spindle 16 will not move since the flat contact 20 is not moving, and the needle 13 on the dial indicator 11 will not deviate from its previously set zero reading. For any imperfections in roundness, the flat contact 20 will move upwardly or downwardly as the pipe 54 rotates relative thereto and provide a corresponding reading on the dial indicator 11. Since the spindle 16 is biased out of the stem 15 and toward the pipe 54, the flat contact 20 will remain in contact with the pipe 54 during the test. Therefore, the device shown in FIGS. 1–4 provides easily for accurate measurements of deviations from roundness of a cylindrical object or the like.

Figure 5:
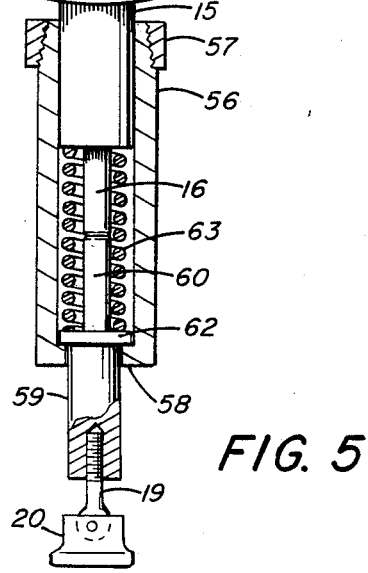
FIG. 5 is a side elevational view, partially in section, of an improved plunger assembly useable in the ovality gauge shown in FIG. 1.

FIG. 5 shows an improvement to the arrangement by which the flat contact 20 is connected to the moveable spindle 16 of the dial indicator 11 shown in FIGS. 1–4. As shown in FIG. 5, a cylindrical plunger housing 56 is positioned with one end snugly around the stem 15 of the dial indicator 11 and is held tightly in place by a collet 57 or the like. The plunger housing 56 has an internal bore slightly larger than the external diameter of the stem 15 to provide for a snug fit thereon. The other end of the plunger housing 56 ends in an inwardly extending flange 58 which defines a smaller bore therein. The moveable spindle 16 of the dial indicator is located within the internal bore of the plunger housing 56. A plunger assembly 59 is provided in the plunger housing 56 at the end carrying the flange 58 and has an inwardly extending, cylindrical upper shank 60 connected to a thicker, outwardly extending cylindrical lower shank 61 by a lip 62. The lower shank 61 has an outer diameter slightly smaller than that of the bore formed by the flange 58. The lip 62 is located within the plunger housing 56 and has an outer diameter slightly smaller than the internal diameter of the bore of the plunger housing 56, but larger than the diameter of the bore formed by the flange 58. The upper shank 60 of the plunger 59 extends within the plunger housing 56 to and in contact with the end of the moveable spindle 16. A coil spring 63 surrounds both the moveable spindle 16 and the upper shank 60 of the plunger 59 and extends between the stem 15 and the lip 62 on the plunger 59. In this manner, the lower shank 61 of the plunger 59 is biased out of the plunger housing 56 as shown in FIG. 5. The ball pivot 19 is threadedly connected to the end of the lower shank 61 of the plunger 59 and the flat contact 20 is pivotally mounted to the ball pivot 19 as described above in connection with FIGS. 1–4.

The arrangement shown in FIG. 5 operates identically to that shown in FIG. 1, namely, the flat contact 20 will ride on the outer surface of the pipe and will move upwardly and downwardly with deviations in the pipe. The plunger 59 will push upward on the spindle 16 or will allow the spindle 16 to move downward and indicate such deviations on the dial indicator 11. The advantage of the arrangement shown in FIG. 5 is that if the pipe or other object should contact and damage the mechanism holding the flat contact 20, it will be an easy matter to remove and replace the entire plunger housing 56 and associated internal elements by loosening the collet 57, withdrawing the entire damaged plunger housing assembly and replacing it with a new assembly. To the extent that the ball pivot 19 and flat contact 20 remain undamaged, they could be reused. Without such an arrangement, if the moveable spindle 16 itself were damaged, the relatively expensive dial indicator 11 must be replaced or repaired.

Figure 6:
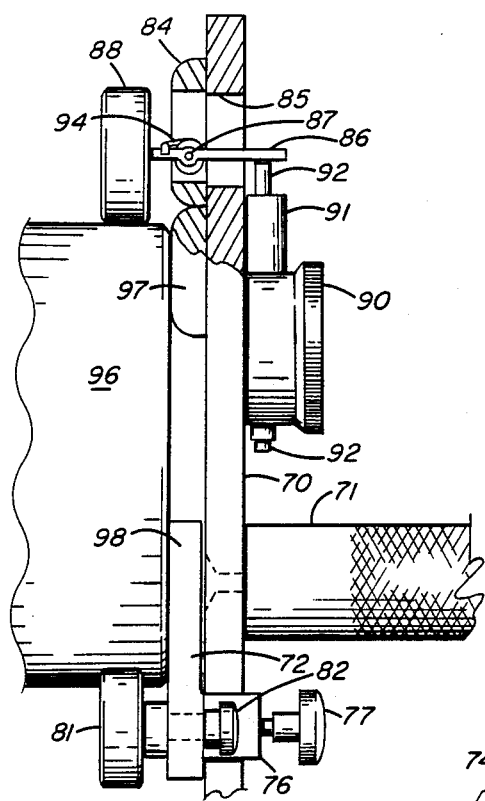
FIG. 6 is a side elevational view of a second embodiment of an ovality gauge in accordance with the present invention positioned on the end of a pipe.
Figure 7:
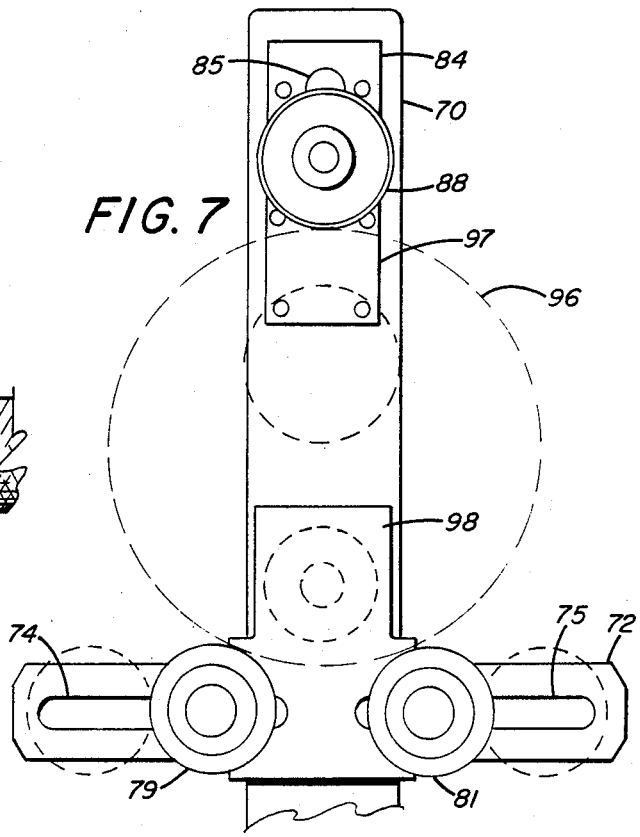
FIG. 7 is a front elevational view of the ovality gauge shown in FIG. 6.
Figure 8:
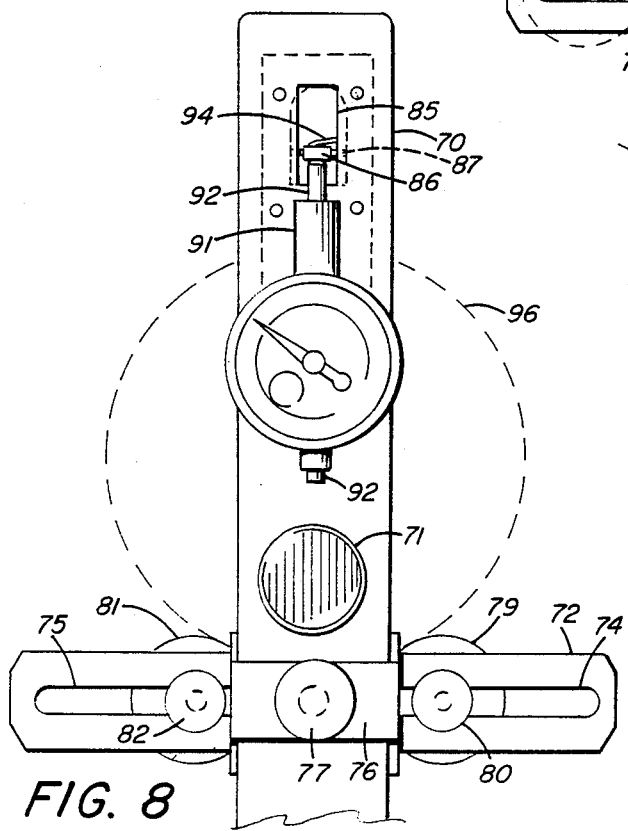
FIG. 8 is a rear elevational view of the ovality gauge shown in FIG. 6.

A second embodiment of an ovality gauge in accordance with the present invention is shown in FIGS. 6–8. This gauge has an elongated gauge body or frame 70 which is basically a rectangular plate substantially longer than it is wide. The frame 70 carries a handle 71 outwardly extending from a rear face thereof. An adjustable roller support arm 72 is mounted to the frame 70 beneath the handle 71 and perpendicular to an axis through the length of said frame 70. The roller support arm 72 is an elongated rectangular plate member having a pair of elongated slots 74, 75 on each end thereof, each extending perpendicularly away from the frame 70. The roller support arm 72 is mounted to the front face of the frame 70 by a cap 76 or the like which carries lock screw 77 extending therethrough to the frame 72. This mounting arrangement is similar to that used to mount the adjustable arm 6 to the vertical frame 3 in the gauge shown in FIGS. 1–4.

A first roller 79 is positioned on the roller support arm 72 adjacent slot 74 and on a face thereof furthest from the front face of the frame 70. The first roller 79 is held in place by locking screw 80 extending through slot 74 from the other face of the roller support arm 72. A second roller 81 is positioned adjacent slot 75 and held in place by lock screw 82. Similar to the first embodiment of the ovality gauge, rollers 79 and 81 can be moved along the slots 74 and 75 and locked in any desired location and the roller support arm 72 can be moved along the frame 70 to any desired location and locked in place. Rollers 79 and 81 have a diameter larger than the width of the roller support arm 72 and, thereby, extend outward therebeyond.

The end of the frame 70 on the opposite side of the handle 71 from the roller support arm 72 carries either mounted thereto or formed integrally therewith a mounting bracket 84 on the face opposite that carrying the handle 71. An elongated slot 85 extends through both the frame 70 and the mounting bracket 84 from one face of the assembly to the other. A rocker arm 86 extends through slot 85 and is pivotally mounted therein to either the mounting bracket 84 or the frame 70 by a pivot pin 87 or the like. The end of the rocker arm 86 adjacent the front face of the frame 70 has a third roller 88 pivotally mounted thereto and rotating in a plane parallel to the front face of the frame 70. The third roller 88 is aligned with and spaced from the first roller 79 and second roller 81 carried by the roller support arm 72. The rollers 79, 81 and 88 are positioned in a plane parallel to the front face of said frame 70.

A dial indicator 90 is mounted on the rear face of the frame 70 beneath the rocker arm 86 and has a stem 91 and moveable spindle 92 extending toward the rocker arm 86 extending out of the slot 85. The dial indicator 90 is positioned with the moveable spindle 92 parallel to an axis passing through the length of the frame 90 and perpendicular to the axis of the roller support arm 72. The end of the rocker arm 86 adjacent the rear face of the frame 70 has a flat notch or recess to provide for contact with the moveable spindle 92. The internal bias of the spindle 92 maintains contact with the rocker arm 86. The pivot pin 87 of the rocker arm 86 can be provided with a surrounding spring 94 or the like to provide a force on the rocker arm 86 to bias the third roller 88 toward the rollers 79, 81 carried by the roller support arm 72. If the gauge were used to measure internal pipes, with the pipe positioned around the rollers 79, 81 and 88, then the bias on the rocker arm 86 would be reversed.

To prevent the end of a pipe 96 from contacting and damaging the frame 70, an upper wear plate 97 and a lower wear plate 98 can be provided on the front face of the frame 70 adjacent the third roller 88 and the pair of rollers 79, 81, respectively. The lower wear plate 98 is preferably formed integral with the roller support arm 72 so that it remains adjacent the pair of rollers 79, 81 wherever the roller support arm 72 is positioned along the frame 70. The wear plates 97, 98 provide for a predetermined, but not adjustable, spacing of the rollers 79, 81, 88 from the end of the pipe 96.

The ovality gauge shown in FIGS. 6–8 is used similarly to that described above in connection with FIGS. 1–4. The roller support arm 72 is positioned along the frame 70 to a particular location as dictated by the diameter of pipe 96 under test and the indicator 90 is zeroed. The rollers 79, 81 on the roller support arm 72 are moved along the slots 74, 75 and positioned also according to the diameter of the pipe 96. The position of the pipe 96 relative to the three spaced rollers 79, 81 and 88 is shown in FIGS. 6–8, particularly FIG. 7. A user then grasps the handle 71, depresses the rocker arm 86 over the moveable spindle 92 to raise the third roller 88, positions the gauge against the end of the pipe 96 with the pipe 96 resting on the rollers 79, 81 carried by the roller support arm 72, and releases the rocker arm 86 to place the third roller in contact with the pipe 96. It is desirable to adjust the position of the roller support arm 72 such that the third roller 88 has a perfectly flat contact with the outer surface of the pipe 96. The pipe 96 is then rotated relative to the gauge or the gauge is rotated about the pipe. If any deviations of the pipe 96 are detected, the third roller 88 will move upwardly or downwardly and rotate the rocker arm 86 about the pivot pin 87. Since the opposite end of the rocker arm 86 is in continuous contact with the moveable spindle 92, it will be accordingly depressed or allowed to raise upwardly and rotate the needle on the dial indicator 90 and directly indicate deviations from the desired shape.

Having described above the presently preferred embodiments of this invention, it is to be understood that it may be otherwise embodied within the scope of the appended claims.

I claim:

1. An ovality gauge comprising:
  (a) a frame including an elongated frame member and a stationary arm extending therefrom perpendicular to and connected to said elongated frame member;
  (b) an elongated adjustable arm connected to and moveable along said elongated frame member and including means for locking said adjustable arm to said elongated frame member in a desired location, with said adjustable arm extending perpendicular outward from said elongated frame member from the same side as, parallel to and spaced from said stationary arm;
  (c) a roller support arm connected to an end of one of said stationary arm or adjustable arm opposite said elongated frame member and extending perpendicular thereto and to a plane parallel to said adjustable arm, frame member and stationary arm;
  (d) a pair of rollers rotatably mounted to said roller support arm and spaced apart from each other;
  (e) indicator means mounted to the other of said stationary arm or adjustable arm and having a moveable contact connected thereto, whereby movement of said moveable contact is detected by said indicator means, with said moveable contact and said pair of rollers aligned with one another in a plane extending perpendicular to said stationary arm and said adjustable arm and parallel to said elongated frame; and
  (f) means on said roller support arm for varying the spacing between said pair of rollers.

2. The gauge of claim 1 wherein said varying means includes a pair of elongated slots therethrough.

3. The gauge of claim 2 wherein each of said pair of rollers is mounted to an adjacent slot by a releasable locking means.

4. The gauge of claim 3 wherein said releasable locking means is a lock screw extending through each slot and connected to each of said rollers.

5. The gauge of claim 2 wherein said roller support arm includes a roller bracket extending perpendicular thereto adjacent each of said slots, with releasable locking means mounting said brackets to said roller support arm and with one of said rollers mounted at the end of each roller bracket opposite said associated slot.

6. The gauge of claim 3 wherein said rollers are mounted on a face of said roller brackets directed toward said elongated frame member.

7. The gauge of claim 1 wherein said indicator means is a dial indicator having a stem and a moveable spindle within said stem, with said moveable contact connected to said moveable spindle, and with said moveable spindle perpendicular to said associated arm.

8. The gauge of claim 7 wherein said moveable contact is a flat contact pivotally mounted to an end of said moveable spindle exterior of said stem.

9. The gauge of claim 8 further including a spring surrounding said stem and spindle and extending between said dial indicator and said moveable contact.

10. The gauge of claim 1 wherein said roller support arm is connected to said adjustable arm and said indicator means is connected to said stationary arm.

11. The gauge of claim 1 wherein the moveable contact is oriented toward said pair of rollers and the pair of rollers are oriented toward the moveable contact.

12. The gauge of claim 10 wherein the moveable contact is oriented toward said pair of rollers and the pair of rollers are oriented toward the moveable contact.

13. The gauge of claim 1 further including a first stop moveably mounted to one of said adjustable arm and stationary arm and including means for releasably locking said first stop to said arm.

14. The gauge of claim 13 further including a second stop moveably mounted to the other of said stationary arm and adjustable arm and including means for releasably locking said second stop to said arm.

15. The gauge of claim 14 wherein each of said stops include a base mounted around an associated arm and one or more fingers carried by a flange on said base.

16. The gauge of claim 15 wherein each of said stops include a plurality of fingers, with the fingers on one stop oriented toward but offset from the fingers on the other stop.

17. The gauge of claim 1 wherein said indicator means is a dial indicator having a stem and a moveable spindle within said stem, with said moveable spindle perpendicular to said associated arm, and further including a plunger housing surrounding said moveable spindle and having one end attached to said stem, a plunger assembly positioned within the other end of said plunger housing and having a first shank extending thereon and contacting said moveable spindle and having a second shank extending out of said plunger housing, means bearing said plunger out of said plunger housing, and retaining means for keeping said plunger within said housing, with said moveable contact pivotally connected to said second shank.

18. The gauge of claim 17 wherein said retaining means is an inward flange on the other end of said plunger housing and a lip on said plunger between said shanks which engages said flange.

19. The gauge of claim 18 wherein said biasing means is a coil spring surrounding said spindle and first shank and extending between said stem and said lip.

20. An ovality gauge comprising:
(a) a gauge body;
(b) a first arm attached to said body and extending perpendicular outward therefrom;
(c) a second arm attached to said body and extending perpendicular outward therefrom along a same side as said first arm, with said second arm spaced from and substantially parallel to said first arm, and with said second arm adjustable along said body and including means for locking said second arm to said body in a desired location;
(d) a roller support arm connected to an end of said second arm opposite said body and extending perpendicular thereto and to a plane parallel to said arms and said body;
(e) a pair of rollers rotatably mounted to said roller support arm and spaced apart from each other;
(f) an indicator means mounted to said gauge;
(g) a moveable contact connected to said first arm in a manner which permits movement of said moveable contact with respect to the other of said arms in a plane parallel to said arms and along a line perpendicular to both arms, with said moveable contact and said pair of rollers aligned with one another in a plane extending perpendicular to said first and second arms and parallel to said gauge body;
(h) moveable means connecting said moveable contact to said indicator means, whereby movement of said moveable contact is detected by said indicators means; and
(i) means on said roller support arm for varying the spacing between said pair of rollers.

21. The gauge of claim 20 wherein said varying means includes a pair of elongated slots therethrough.

22. The gauge of claim 21 wherein each of said pair of rollers in mounted to an adjacent slot by a releasable locking means.

23. The gauge of claim 22 wherein said releasable locking means is a lock screw extending through each slot and connected to each of said rollers.

24. The gauge of claim 21 wherein said roller support arm includes a roller bracket extending perpendicular thereto adjacent each of said slots, with releasable locking means mounting said brackets to said roller support arm and with one of said rollers mounted at the end of each roller bracket opposite said associated slot.

25. The gauge of claim 24 wherein said rollers are mounted on a face of said roller brackets directed toward said gauge body.

26. The gauge of claim 20 further including a first stop moveably mounted to one of said arms and including means for releasably locking said first stop to said arm.

27. The gauge of claim 26 further including a second stop moveably mounted to the other of said arms and including means for releasably locking said second stop to said arm.

28. The gauge of claim 27 wherein each of said stops include a base mounted around an associated arm and one or more fingers carried by a flange on said base.

29. The gauge of claim 28 wherein each of said stops include a plurality of fingers, with the fingers on one stop oriented toward but offset from the fingers on the other stop.

30. An ovality gauge comprising:
(a) a frame including an elongated frame member and a stationary arm extending therefrom perpendicular to and connected to said elongated frame member;
(b) an adjustable roller support arm connected to and moveable along said elongated frame member and including means for locking said roller support arm onto said frame member in a particular location therein, said roller support arm extending beyond said frame member perpendicular to an axis extending along the length of said frame member;
(c) a pair of rollers rotatably mounted to said roller support arm on a face opposite said frame member and spaced apart from each other;
(d) indicator means mounted to said stationary arm and having a moveable contact connected thereto whereby movement of said moveable contact is detected by said indicator means, with said moveable contact and said pair of rollers aligned with one another in a plane extending perpendicular to said stationary arm and parallel to said elongated frame member; and (e) means on said roller support arm for varying the spacing between said pair of rollers.

31. The gauge of claim 30 wherein said varying means includes a pair of elongated slots therethrough.

32. The gauge of claim 31 wherein each of said pair of rollers is mounted to an adjacent slot by a releasable locking means.

33. The gauge of claim 32 wherein said releasable locking means is a lock screw extending through each slot and connected to each of said rollers.

34. The gauge of claim 30 wherein said indicator means is a dial indicator having a stem and a moveable spindle within said stem, with said moveable contact connected to said moveable spindle, and with said moveable spindle perpendicular to said stationary arm.

35. The gauge of claim 34 wherein said moveable contact is a flat contact pivotally mounted to an end of said moveable spindle exterior of said stem.

36. The gauge of claim 35 further including a spring surrounding said stem and spindle and extending between said dial indicator and said moveable contact.

37. The gauge of claim 30 wherein the moveable contact is oriented toward said pair of rollers and the pair of rollers are oriented toward the moveable contact.

38. The gauge of claim 30 wherein said indicator means is a dial indicator having a stem and a moveable spindle within said stem, with said moveable spindle perpendicular to said associated arm, and further including a plunger housing surrounding said moveable spindle and having one end attached to said stem, a plunger assembly positioned within the other end of said plunger housing and having a first shank extending thereon and contacting said moveable spindle and having a second shank extending out of said plunger housing, means bearing said plunger out of said plunger housing, and retaining means for keeping said plunger within said housing, with said moveable contact pivotally connected to said second shank.

39. The gauge of claim 38 wherein said retaining means is an inward flange on the other end of said plunger housing and a lip on said plunger between said shanks which engages said flange.

40. The gauge of claim 39 wherein said biasing means is a coil spring surrounding said spindle and first shank and extending between said stem and said lip.

41. An ovality gauge comprising:
(a) a frame including an elongated frame member and a stationary arm extending therefrom perpendicular to and connected to said elongated frame member;
(b) an elongated adjustable arm connected to and moveable along said elongated frame member and including means for locking said adjustable arm to said elongated frame member in a desired location, with said adjustable arm extending perpendicular outward from said elongated frame member from the same side as, parallel to and spaced from said stationary arm;
(c) a roller support arm connected to an end of one of said stationary arm or adjustable arm opposite said elongated frame member and extending perpendicular thereto and to a plane parallel to said adjustable arm, frame member and stationary arm;
(d) a pair of rollers rotatably mounted to said roller support arm and spaced apart from each other;
(e) indicator means mounted to the other of said stationary arm or adjustable arm and having a moveable contact connected thereto, whereby movement of said moveable contact is detected by said indicator means, with said moveable contact and said pair of rollers aligned with one another in a plane extending perpendicular to said stationary arm and said adjustable arm and parallel to said elongated frame;
(f) a first stop moveably mounted to one of said adjustable arm and stationary arm and including means for releaseably locking said first stop to said arm; and
(g) a second stop moveably mounted to the other of said stationary arm and adjustable arm and including means for releaseably locking said second stop to said arm, with each of said stops including a base mounted around an associated arm and one or more fingers carried by a flange on said base.

42. The gauge of claim 41 wherein each of said stops include a plurality of fingers, with the fingers on one stop oriented toward but offset from the fingers on the other stop.

43. An ovality gauge comprising:
(a) a gauge body;
(b) a first arm attached to said body and extending perpendicular outward therefrom;
(c) a second arm attached to said body and extending perpendicular outward therefrom along a same side as said first arm, with said second arm spaced from and substantially parallel to said first arm, and with said second arm adjustable along said body and including means for locking said second arm to said body in a desired location;
(d) a roller support arm connected to an end of said second arm opposite said body and extending perpendicular thereto and to a plane parallel to said arms and said body;
(e) a pair of rollers rotatably mounted to said roller support arm and spaced apart from each other;
(f) an indicator means mounted to said gauge;
(g) a moveable contact connected to said first arm in a manner which permits movement of said moveable contact with respect to the other of said arms in a plane parallel to said arms and along a line perpendicular to both arms, with said moveable contact and said pair of rollers aligned with one another in a plane extending perpendicular to said first and second arms and parallel to said gauge body;
(h) moveable means connecting said moveable contact to said indicator means, whereby movement of said moveable contact is detected by said indicator means;
(i) a first stop moveably mounted to one of said arms and including means for releasably locking said first stop to said arm; and
(j) a second stop moveably mounted to the other of said arms and including means for releaseably locking said second stop to said arm, with each of said stops including a base mounted around an associated arm and one or more fingers carried by a flange on said base.

44. The gauge of claim 43 wherein each of said stops includes a plurality of fingers, with the fingers on one stop oriented toward but offset from the fingers on the other stop.

* * * * *

UNITED STATES PATENT AND TRADEMARK OFFICE
CERTIFICATE OF CORRECTION

PATENT NO. : 4,977,682

DATED : December 18, 1990

INVENTOR(S) : Charles H. Allen, III

It is certified that error appears in the above-identified patent and that said Letters Patent is hereby corrected as shown below:

Column 1 Line 66 after "3,191,311" insert --,--.

Column 3 Line 12 "t he" should read --the--.

Column 7 Line 65 after "indicator" insert --11--.

Claim 6 Line 61 Column 10 "3" should read --5--.

Signed and Sealed this

Twenty-first Day of May, 1991

Attest:

HARRY F. MANBECK, JR.

*Attesting Officer*   *Commissioner of Patents and Trademarks*